United States Patent [19]

Isaka et al.

[11] Patent Number: 5,374,665

[45] Date of Patent: Dec. 20, 1994

[54] ANTIFOULING PAINT COMPOSITION

[75] Inventors: Hisashi Isaka; Osamu Isozaki, both of Hiratsuka, Japan

[73] Assignee: Kansai Paint Co., Ltd., Japan

[21] Appl. No.: 110,676

[22] Filed: Aug. 9, 1993

Related U.S. Application Data

[63] Continuation of Ser. No. 834,821, Feb. 13, 1992, abandoned.

[30] Foreign Application Priority Data

Feb. 14, 1991 [JP] Japan .................. 3-042542

[51] Int. Cl.$^5$ .................. C08L 51/00; B32B 9/04
[52] U.S. Cl. .................. 523/122; 428/411.1; 523/179; 523/201; 524/504; 525/902
[58] Field of Search .................. 523/122, 177, 201; 524/413, 504; 525/902; 428/411.1

[56] References Cited

U.S. PATENT DOCUMENTS 4,985,064  1/1991  Redlich et al. .................. 523/122
5,026,424  6/1991  Ohta et al. .................. 424/405

*Primary Examiner*—Peter Szekely
*Attorney, Agent, or Firm*—Wenderoth, Lind & Ponack

[57] ABSTRACT

An antifouling paint composition comprising a resin vehicle, an antifouling agent and a liquid medium, at least part of the resin vehicle being composed of a nonaqueous dispersion-type resin of a skin-core structure having in the core component an acid group or an acid precursor group convertible into the acid group by hydrolysis, and said antifouling composition being capable of maintaining an effect of preventing adhesion of microorganisms over along term.

18 Claims, No Drawings

ANTIFOULING PAINT COMPOSITION

This application is a Rule 62 continuation of now abandoned application, Ser. No. 07/834,821, filed Feb. 13, 1992.

FIELD OF THE INVENTION

This invention relates to an antifouling paint composition that dan form a coated film capable of preventing fouling due to marine organisms over a long term.

BACKGROUND OF THE INVENTION

Antifouling paints obtained by blending vehicle components such as a toughener, a rosin, a plastisizer, etc. with an antifouling agent, or antifouling paints using polymers or copolymers of organotin-containing unsaturated monomers as described in, e.g., Japanese Patent Publication Nos. 21,426/1965, 9,579/1969 and 12,049/1976 have been generally coated so far on underwater portions of ships or marine structures to prevent corrosion due to adhesion of submarine organisms such as barnacle, ascidian, seaweed, etc. and on equipment such as a cultivation net for useful ocean culture to prevent death of fish and shellfish owing to adhesion of submarine organisms.

The former antifouling paints exhibit an antifouling effect by dissolving the rosin and the antifouling agent contained in the coated film obtained therefrom. However, when amounts of insoluble matters become large in the coated film during long-term dipping in seawater, the coated surface becomes uneven, resulting in decrease of an effect to prevent adhesion of submarine organisms. Meanwhile, the latter antifouling paints contain the organotin compound introduced into the (co)-polymers via an ester linkage. When the coated film formed therefrom is dipped in seawater, the organotin compound is released and a carboxyl group-containing polymer is formed by hydrolysis of the ester linkage. This polymer is dissolved in seawater and a fresh coated film is always exposed, maintaining the antifouling property. Nevertheless, many organotin compounds are ordinarily introduced into the antifouling paints to effectively exhibit the antifouling property of the coated film, and give an adverse effect on fish and shellfish.

For improving the aforesaid defects, a method in which an antifouling coated film is formed using an antifouling paint containing an acid anhydride group-containing resin as a vehicle component and an antifouling agent such as cuprous oxide is proposed in Japanese Laid-open Patent Application No. 99,567/1990. The resin used in this method is a copolymer having a cyclic acid anhydride group in a molecule and obtained by subjecting a polymerizable unsaturated acid anhydride such as itaconic anhydride or maleic anhydride to radical copolymerization reaction with another unsaturated monomer. A coated film formed by using a paint containing said copolymer as a vehicle component, upon hydrolysis, forms two carboxyl groups from the acid anhydride to render the copolymer water-soluble. As soon as the copolymer is dissolved in seawater, the antifouling agent present, such as cuprous oxide, is also dissolved therein, and a fresh coated film is always exposed, maintaining anti-fouling property. Since, however, the hydrolysis which the acid anhydride group of the copolymer undergoes by a moisture of air or seawater proceeds very quickly, the coated film formed by the above method can hardly keep a good antifouling property for a long period of time.

It is an object of this invention to provide an antifouling paint composition which maintains excellent antifouling property for a long period of time by controlling a rate of hydrolysis of a resin as a vehicle component, and which can form a less toxic coated film.

The present inventors have made extensive investigations to achieve the object, and as a result, have found that a rate of hydrolysis of a resin as a vehicle component can be controlled by containing in the vehicle resin component a nonaqueous dispersion-type resin of a skin-core structure having an acid group in the core.

SUMMARY OF THE INVENTION

Thus, according to this invention, there is provided an antifouling paint composition comprising a resin vehicle, an antifouling agent and a liquid medium, at least part of the resin vehicle being composed of a nonaqueous dispersion-type resin of a skin-core structure having in the core component an acid group or an acid precursor group convertible into the acid group by hydrolysis.

The antifouling paint composition of this invention will be explained in more detail below.

DESCRIPTION OF THE INVENTION

A "nonaqueous dispersion-type resin of a skin-core structure" here referred to includes a resin obtained by stably dispersing a high-polarity high-molecular resin particulate component (hereinafter referred to at times as a "core component") into a nonaqueous liquid medium in a low-polarity solvent such as xylene or hexane or a solvent mixture composed mainly of the low-polarity solvent using a low-polarity high-molecular component (hereinafter referred to at times as a "skin component") as a dispersion stabilizer.

It is advisable that the paint composition containing such a nonaqueous dispersion-type resin is in the form of particles in the coated film obtained by using said composition;part or the whole of said particles may be fused if required.

The nonaqueous dispersion-type resin available in this invention can be a resin known per se; or, it can be produced like the known resin. Such a nonaqueous dispersion-type resin and its producing method are described in, e.g., U.S. Pat. Nos. 3,607,821, 4,147,688, 4,493,914 and 4,960,828, Japanese Patent Publication No. 29,551/1973 and Japanese Laid-open Patent Application No. 177,068/1982. Specifically, as the skin component (dispersion stabilizer) constituting the nonaqueous dispersion-type resin, various high-molecular substances soluble in a low-polarity solvent which are described in, e.g., U.S. Pat. No. 4,960,828 (Japanese Laid-open Patent Application No. 43374/1989), can be used. From the aspect of antifouling property of the final paint composition, low-polarity high-molecular substances such as an acrylic resin, a polyester resin, an alkyd resin, a fluorine resin, a silicone resin, a vinyl resin, a polydiene resin and a polyalkylene oxide resin can be taken, for example. As the core component, a copolymer of an ethylenically unsaturated monomer having a high polarity is generally available.

The nonaqueous dispersion-type resin can be formed by a method known per se. Examples thereof are a method in which the core component and the skin component are previously formed by block copolymerization or graft copolymerization, and they are then mixed in a low-polarity solvent and, if required, reacted to form a nonaqueous dispersion (see Japanese Patent Publication No. 29,551/1973), and a method in which a mixture of ethylenically unsaturated monomers at least one of which has a high-polarity group is copolymerized in a solvent that dissolves the ethylenically unsaturated monomer but does not dissolve a polymer (core component) formed therefrom and in the presence of a dispersion stabilizer that either dissolves or stably disperses in said solvent, and if required, the obtained copolymer is further reacted with said dispersion stabilizer to afford a final nonaqueous dispersion (see U.S. Pat. No. 3,607,821 (Japanese Patent Publication No. 48,566/1982) and Japanese Laid-open Patent Application No. 177,068/1982). In the latter method, the dispersion stabilizer containing in a molecule the component soluble in the low-polarity solvent and the component having affinity for the resin being dispersed, or the dispersion stabilizer of the specific composition that dissolves in the low-polarity solvent is present as the skin component, and particles being dispersed as the core component are formed by copolymerization of the monomers.

In the nonaqueous dispersion-type resin of the skin-core structure used in this invention, it is important that at least the core component has an acid group or an acid precursor group convertible into the acid group by hydrolysis. If required, the acid group or the acid precursor group may be contained in the skin component. Thus, the nonaqueous dispersion-type resin can have a resin acid value of usually 30 to 500 mg KOH/g, preferably 30 to 300 mg KOH/g, more preferably 60 to 200 mg KOH/g (when the core component and/or the skin component contains the acid precursor group, the resin acid value is one given after the group is converted into the acid group by hydrolysis). The "resin acid value" here referred to is an amount (Mg) of KOH consumed to neutralize 1 g of a resin (solids content), expressing a content of an acid group (in case of the acid precursor group, a content of an acid group formed by hydrolysis) of the resin (solids content). It is advisable that the acid group and/or the acid precursor group is contained in the core component such that the content thereof is, as a resin acid value, at least 80%, preferably at least 90%, more preferably at least 95% of the resin acid value of the nonaqueous dispersion-type resin. To this end, desirously, a value found by the following equation meets the above requirement in selecting a proportion of the monomer having the acid value or the acid precursor group in the monomer composition to form the core component.

$$[\text{Resin acid value (mg KOH/g) in a nonaqueous dispersion-type resin ascribable to an acid group and/or an acid precursor group of a core component}] = \frac{[\text{Mol equivalent of a free acid group of a monomer having an acid group or an acid precursor group}] \times 56100 \text{ (mg)}}{[\text{Total amount (g) of a monomer to to form a core component of a nonaqueous dispersion-type resin}]} \times [\text{Proportion of a core component occupied in a nonaqueous dispersion-type resin}](*)$$

Namely, it is advisable that the resin acid value of the core component itself corresponding to (*) in the above equation is 40 to 700, preferably 40 to 600, more preferably 70 to 500.

Examples of the acid group that the core component can contain are a carboxyl group, a sulfonic acid group and a phosphoric acid group. Examples of the acid precursor group are anhydrides, esters and metal esters of these acid groups. Of these, the carboxylic acid groups and the anhydride groups are preferable.

A ratio of the core component and the skin component in the nonaqueous dispersion-type resin used in this invention is not strictly limited, but can vary within a wide range depending on the type of the core component and/or the skin component. The core component/skin component weight ratio is usually 95/5 to 30/70, preferably 90/10 to 50/50.

Production of the nonaqueous dispersion-type resin available in this .invention will be explained in detail below by taking a nonaqueous dispersion-type resin having a core component based on an acrylic resin.

Such a resin can be preferably produced by dispersion polymerization of an ethylenically unsaturated monomer mixture composed mainly of an acrylic monomer in a low-polarity solvent in the presence of a high-molecular dispersion stabilizer using a radical polymerization initiator.

The ethylenically unsaturated monomer mixture used to form the core component can be a combination of, as an essential component, a monomer containing an acid group or an acid precursor group such as (meth)acrylic acid, itaconic acid, maleic acid or maleic anhydride with at least one copolymerizable monomer. Examples of the copolymerizable monomer are $C_1$-$C_{18}$ alkyl esters of (meth)acrylic acid such as methyl (meth)acrylate, ethyl (meth)acrylate, butyl (meth)acrylate, 2-ethylhexyl (meth)acrylate, and lauryl (meth)acrylate; $C_2$-$C_8$-hydroxyalkyl esters of (meth)acrylic acid such as 2-hydroxyethyl (meth)acrylate; glycidyl (meth)acrylate; (meth)acrylonitrile; (meth)acrylic acid amides such as n-butoxymethyl (meth)acrylamide, and n-methylol (meth)acrylamide; vinyl aromatic compounds such as styrene, alpha-methylstyrene, and divinylbenzene; and vinyl acetate. For example, a combination of, as a main component, a relatively high-polarity monomer such as methyl (meth)acrylate, ethyl (meth)acrylate, n-butyl (meth)acrylate or acrylonitrile with (meth)acrylic acid can be shown. On this occasion, a ratio of the monomer having the acid group or the acid precursor group in the monomer mixture can be an amount to satisfy the aforesaid resin acid value of the core component.

The core component can be crosslinked by using a polyfunctional monomer (e.g., divinylbenzene, and ethylene glycol dimethacrylate) as a component of part of the monomer mixture or plural monomers having functional groups that react with each other, such as glycidyl (meth)acrylate and (meth)acrylic acid.

On the other hand, the high-molecular dispersion stabilizer constituting the skin component can be, for example, a (co)polymer soluble or partially dissolved in a low-polarity solvent and obtained by (co)polymerizing monomers shown as monomers making up the core component, or the following resins (1)-(9) which have been so far used to form the nonaqueous dispersion-type resin.

(1) A polyester macromer obtained by adding glycidyl acrylate or glycidyl methacrylate to a self-condensation polyester of a hydroxyl group-containing aliphatic acid such as 12-hydroxystearic acid to introduce about 1 polymerizable double bond into the molecule.

(2) A comb-like polymer obtained by copolymerizing the polyester macromer (1) with methyl methacrylate and/or another (meth)acrylic acid ester or a vinyl monomer.

(3) A product obtained by copolymerizing the polymer (2) with a small amount of glycidyl (meth)acrylate and then adding (meth)acrylic acid to the glycidyl group to introduce a double bond.

(4) A hydroxyl group-containing acrylic copolymer obtained by copolymerizing at least 20% of a (meth)acrylic acid ester of a monoalcohol containing 4 or more carbon atoms.

(5) An acrylic copolymer obtained by introducing into the copolymer (4) 0.3 or more of a double bond per molecule based on the number average molecular weight. The double bond is introduced by, for example, copolymerizing the original acrylic copolymer with a small amount of glycidyl (meth)acrylate and then adding (meth)acrylic acid to the glycidyl group.

(6) An alkylmelamine resin having a high permissible ratio of mineral spirits.

(7) An alkyd resin having an oil length of 15% or more and/or said resin with a polymerizable double bond introduced. The double bond is introduced, for example, by adding glycidyl (meth)acrylate to the carboxyl group of the alkyd resin.

(8) An oil free polyester resin having a high permissible ratio of mineral spirits, an alkyd resin having an oil length of less than 15% and/or the resin with a polymerizable double bond introduced.

(9) A cellulose acetate butyrate with a polymerizable double bond introduced. The double bond is introduced, for example, by adding isocyanoethyl methacrylate to cellulose acetate butyrate.

These dispersion stabilizers are used either singly or in combination.

The number-average molecular weight of the dispersion stabilizer is preferably 1,000 to 50,000, more preferably 3,000 to 20,000.

Of the above high-molecular dispersion stabilizers, a preferable stabilizer is one formed by copolymerizing a monomer mixture composed mainly of a low-polarity monomer of a relatively long chain such as n-butyl methacrylate, 2-ethylhexyl methacrylate, dodecyl methacrylate, lauryl methacrylate or stearyl methacrylate and further containing, as required, another monomer such as styrene, methyl (meth)acrylate, ethyl (meth)acrylate, 2-hydroxyethyl (meth)acrylate, propyl (meth)acrylate or (meth)acrylic acid by solution polymerization preferably using a radical polymerization initiator, and then adding glycidyl (meth)acrylate or isocyanate ethyl methacrylate to the obtained (co)-polymer to introduce a polymerizable double bond therein.

Examples of the low-polarity solvent used in the dispersion polymerization are aliphatic hydrocarbons such as hexane, heptane and octane, xylene, toluene, and mixtures thereof.

It is advisable that the nonaqueous dispersion-type resin prepared as above is in the form of dispersion fine particles having an average particle size of usually 30 to 1,000 nm, especially 80 to 800 nm.

The resin vehicle in the paint composition of this invention can contain the nonaqueous dispersion-type resin in an amount of usually 1 to 100% by weight, preferaly 30 to 90% by weight based on the weight of the resin vehicle, and the remainder can be another resin compatible with the nonaqueous dispersion-type resin. Another resin is a resin which has been used so far as a vehicle in the antifouling paint. Examples thereof are a rosin, an acrylic resin, a polyester resin, an alkyd resin, a fluorine resin, a silicone resin, a vinyl resin, a polydiene resin and a polyalkylene oxide resin. Of these, the rosin having excellent solubility in (sea)water is preferable.

Said another resin can be blended according to desirous performance such as film-formability of an antifouling coating or solubility in seawater, and the performance can be controlled. Moreover, it can have an acid group or a group convertible into the acid group by hydrolysis as required.

The antifouling agent that can be contained in the paint composition of this invention is not particularly limited, and an antifouling agent which has been so far used in the antifouling paint is available. Examples of the antifouling agent are copper-type antifouling agents such as cuprous oxide, copper thiocyanate and copper powder; nitrogen-containing sulfur-type antifouling agents such as zinc ethylenebis(dithiocarbamate), and tetramethylthiuram disulfide; bactericides such as a nitrile compound, a benzothiazole compound, a triazine compound, a urea compound, an isothiazoline compound, a maleimide compound, an N-haloalkylthio compound, a tetracycline compound, and a pyridine compound such as zinc pyrithione; and zinc oxide. Of these, cuprous oxide and zinc ethylenebis(dithiocarbamate) are preferable. They may be used either singly or in combination.

The amount of the antifouling agent is not particularly limited either, and can vary within a wide range depending on the type of the antifouling agent, the use of the final paint composition, etc. It is usually 25 to 300 parts by weight, preferably 50 to 200 parts by weight per 100 parts by weight of the resin vehicle.

The liquid medium that can be used in the paint composition of this invention is not particularly limited unless having a substantially adverse effect on dispersibility of the nonaqueous dispersion-type resin or the acid group or the acid precursor group of the resin. Any liquid medium which is ordinarily used in the field of paints is available. Examples of the liquid medium are hexane, toluene, xylene, ethyl acetate, diethyl ether, ethylene glycol dimethyl ether, methyl ethyl ketone, methyl isobutyl ketone and cyclohexane.

The paint composition of this invention can further contain, if required, the other ingredients commonly used in the field of paints, such as an extender pigment, a color pigment, a plastisizer, and additives for paints. Examples of the extender pigment are calcium carbonate, varium sulfate, talc, clay, silica and gypsum. Examples of the color pigment are titanium oxide, zinc oxide, basic lead carbonate, carbon black, graphite, chrome yellow, red oxide, red lead oxide, chromium oxide, and cobalt blue. Examples of the plastisizer are tricresyl phosphate, and chlorinated paraffins. Examples of the additives for paints are an antisagging agent, a defoamer, and an anti-settling agent.

The paint composition of this invention can be prepared by blending the aforesaid ingredients in a usual manner. On this occasion, the solids content is usually 30 to 75% by weight.

The paint composition of this invention can be applied to a base material in submarine structures (e.g., ships, port facilities, buoys, pipelines, bridges, submarine bases, cultivation nets, and fixed shore nets) and buildings requiring antifouling property. When said paint composition is used in the submarine structures, it is advisable that antifouling paints such as a zinc epoxy-type shop primer and an epoxy-type chlorinated rubber undercoat paint are coated, and the paint composition of this invention is then applied.

The paint composition of this invention can be coated on a substrate by ordinary coating such as brush coating, spray coating, roller coating or dip coating. The amount of coating is not particularly limited; it is usually 50 to 150 micrometers, especially 80 to 150 micrometers as a dry film thickness. The coated film can be dried at room temperature; heat-drying may be conducted at a temperature up to about 200° C., as required.

The paint composition of this invention can form a coated film that maintains excellent antifouling property over a long period of time as will be later shown in Examples.

Since the core component having the acid group or the acid precursor group is protected with the skin component in the nonaqueous dispertion-type resin, the paint composition of this invention is stable as resin particles within the coated film for a long period of time as compared to common acid group-containing resins. Meanwhile, the resin particles on the surface of the coated film undergo hydrolysis in contact with (sea)water, collapsed and dissolved, or the finely divided resin particles are not collapsed but swollen and worn, whereby the whole surface of the coated film is uniformly worn and a fresh surface of the coated film is exposed, exhibiting antifouling property. Even when part or the whole of the resin particles are fused, the skin component is highly blocked or grafted on the core component, and the low-polarity skin component thus protects the core component; the resin particles are stably present within the coated film. On the surface of the coated film, the fused particles are dissolved like the finely divided particles. When the other resin than the nonaqueous dispersion-type resin is conjointly used as a vehicle, it is presumed that said resin is dissolved or worn before or after the finely divided nonaqueous dispersion-type resin is passed through the surface of the coated film by dissolving, and the whole surface of the coated film is always uniformly worn; this depends on the mixing ratio or the content of the acid group though.

Accordingly, the antifouling coated film formed by using the paint composition of this invention is stable in the rate of hydrolysis in (sea)water, making it possible to exhibit excellent antifouling property for a long period of time. Besides, said coated film is less toxic and therefore quite useful to protect submarine structures.

EXAMPLES

This invention is illustrated more specifically by the following Preparation Examples, Comparative Preparation Example, Examples and Comparative Examples. However, this invention is not limited thereto. In said Examples, "parts" and "%" are all by weight.

PREPARATION OF A NONAQUEOUS DISPERSION-TYPE RESIN SOLUTION

Preparation Example 1

A four-necked flask fitted with a stirring rod, a thermometer and a reflux condenser was charged with 49.4 parts of xylene, and kept at 100° C. Fifty parts of n-butyl methacryalte, 45 parts of 2-ethylhexyl methacrylate, 5 parts of glycidyl methacrylate and 3 parts of azobisisobutylonitrile were added dropwise with stirring over three hours, and reacted. After the reaction mixture was maintained for 1 hour, a mixture comprising 1 part of azobisisobutylonitrile and 5 parts of xylene was added dropwise over 1 hour, and reacted. The temperature was then elevated to 120° C., and 1 part of methacrylic acid, 0.05 part of tetraethylammonium bromide and 0.05 part of methoxyphenol were added to the flask, and reacted for 8 hours to obtain a skin component solution A which was a light brown viscous liquid having a solids content of 65%.

The same device as above was charged with 86.2 part of xylene, 100 parts of n-heptane and 50 parts of N-1000 (a trademark for a hydrocarbon solvent made by Swasol Cosmo Oil Co., Ltd.), and kept at 90° C. The above obtained skin component solution A (153.8 parts), 20 parts of acrylic acid, 30 parts of methyl methacrylate, 50 parts of methyl acrylate and 3 parts of azobisisobutylonitrile were added dropwise over 4 hours with stirring, and reacted. After the reaction mixture was maintained for 1 hour, a mixture comprising 1 part of azobisisobutylonitrile and 10 parts of xylene was added dropwise over 1 hour. The reaction was further conducted for 1 hour to obtain a nonaqueous dispersion-type resin solution which was a dark yellow semitransparent liquid having a solids content of 40% and a resin acid value of 78 mg KOH/g. An average particle size of the dispersion particles was 120 nm.

Preparation Example 2

The same device as in Preparation Example 1 was charged with 96.9 parts of xylene, 100 parts of n-heptane and 50 parts of Swasol N-1000, and kept at 90° C. The skin component solution (123.1 parts) obtained in Preparation Example 1, 25 parts of maleic anhydride, 30 parts of styrene, 65 parts of methyl acrylate and 4 parts of azobisisobutylonitrile were added dropwise over 3 hours, and reacted. After the reaction mixture was maintained for 1 hour, a mixture comprising 1 part of azobisisobutylonitrile and 10 parts of xylene was added dropwise over 1 hour, and the reaction was further effected for 1 hour to obtain a nonaqueous dispersion-type resin solution which was a light pink solution having a solids content of 40% and a resin acid value of 143 mg KOH/g. An average particle size of the dispersion particles was 180 nm.

Preparation Example 3

The same device as in Preparation Example 1 was charged with 54.1 parts of xylene. An unsaturated polyester (66.7 parts) obtained by self-condensing 12-hydroxystearic acid until an acid value reached about 31 to 34 mg KOH/g (corresponding to a molecular weight of 1,650 to 1,800) and reacting the condensate with an equimolar amount of glycidyl methacrylate was reacted with a mixture comprising 32.3 parts of methyl methacrylate and 1 part of glycidyl methacrylate as in Preparation Example 1. The reaction mixture was reacted with 0.56 part of acrylic acid to obtain a skin component solution B having a solids content of 65%.

A nonaqueous dispersion-type resin solution having a solids content of 40% and a resin acid value of 143 mg KOH/g was obtained as in Preparation Example 2 except using the skin component solution B instead of the skin component solution A. An average particle size of the dispersion particles was 120 nm.

Comparative Preparation Example 1

The same device as in Preparation Example 1 was charged with 140 parts of butyl acetate, and 20 parts of maleic anhydride, 20 parts of styrene, 60 parts of ethyl acrylate and 2 parts of azobisisobutylonitrile were added dropwise over 3 hours. The reaction was conducted at 110° C. with stirring. One hour later, a mixture comprising 1 part of azobisisobutylonitrile and 10 parts of butyl acetate was added dropwise over 1 hour, and reacted. There resulted an acid group-containing vinyl polymer solution which was a light brown viscous solution having a solids content of 40%.

Example 1

The nonaqueous dispersion-type resin solution (250 parts) obtained in Preparation Example 1, 100 parts of cuprous oxide, 100 parts of calcium carbonate, 20 parts of red oxide, 5 parts of Aerosil #200 (a trademark for a silica powder made by Degussa AG) and 50 parts of xylene were mixed and dispersed with a paint conditioner to obtain an antifouling paint.

Examples 2 to 4 and Comparative Examples 1 to 3

In the same way as in Example 1, antifouling paints in Examples 2 to 4 and Comparative Examples 1 to 3 were formed with the formulations shown in Table 1.

TEST FOR ANTIFOULING PROPERTY

Each of the antifouling paints obtained in Examples and Comparative Examples was coated to a dry film thickness of 100 micrometers onto a coated plate obtained by previously coating a zinc epoxy-type shop primer (a dry film thickness 15 micrometers) and an epoxy-type rust-proofing paint (a dry film thickness 200 micrometers) on a 100×300×2 mm sandblasted steel plate, and dried for 7 days to form a test coated plate. The test coated plates were dipped in Toba Bay, Mie Prefecture for 24 months, and antifouling property thereof was then evaluated (the value is an area (%) to which submarine organisms adhered). The results are shown in Table 2.

TABLE 2

| | | Examples | | | | Comparative Examples | | |
|---|---|---|---|---|---|---|---|---|
| | | 1 | 2 | 3 | 4 | 1 | 2 | 3 |
| Anti-fouling property | after 6 months | 0 | 0 | 0 | 0 | 0 | 0 | 0 |
| | after 12 months | 0 | 0 | 0 | 0 | 0 | 15 | 0 |
| | after 18 months | 0 | 0 | 0 | 0 | 0 | 30 | 10 |
| | after 24 months | 0 | 0 | 0 | 0 | 10 | 60 | 40 |

What we claim is:

1. An antifouling paint composition comprising a blend of a resin vehicle, an antifouling agent and a liquid medium, at least part of the resin vehicle being composed of a nonaqueous dispersion of polymer particles of a skin-core structure having in the core component an acid group or an acid precursor group convertible into the acid group by hydrolysis and said polymer having an acid value of 30 to 500 mg KOH/g, said composition being prepared by blending the preformed nonaqueous dispersion with the antifouling agent, the liquid medium, and other optional ingredient(s).

2. The antifouling paint composition of claim 1 wherein the core component has a carboxyl group or its anhydride group.

3. The antifouling paint composition of claim 1 wherein said polymer has an acid value of 30 to 300 mg KOH/g.

4. The antifouling paint composition of claim 1 wherein the content of the acid group and the acid precursor group of the core component is, as an acid value, at least 80% of the acid value of the nonaqueous dispersion of polymer particles.

5. The antifouling paint composition of claim 4 wherein the content of the acid group and the acid precursor group of the core component is, as an acid

TABLE 1

| | Examples | | | | Comparative Examples | | |
|---|---|---|---|---|---|---|---|
| | 1 | 2 | 3 | 4 | 1 | 2 | 3 |
| Nonaqueous dispersion-type resin solution | | | | | | | |
| Preparation Example 1 | 250 | | | | | | |
| Preparation Example 2 | | 250 | 125 | | | | |
| Preparation Example 3 | | | | 200 | | | |
| Vinyl polymer solution in comparative preparation Example 1 | | | | | 250 | | |
| Vinyl chloride resin | | | | | 50 | | |
| Chlorinated rubber resin | | | | | | | 25 |
| Rosin | | | 100 | 50 | | 50 | 75 |
| Cuprous oxide | 100 | 100 | 100 | 100 | 100 | | 150 |
| Calcium carbonate | 100 | 100 | 100 | 100 | 100 | | |
| Red Oxide | 20 | 20 | 20 | 20 | 20 | 25 | 20 |
| Aerosil #200 | 5 | 5 | 5 | 5 | 5 | | |
| Tricresyl phosphate | | | | | | 20 | 20 |
| Zinc ethylenebis(dithio-carbamate) | | | | | | 100 | |
| Talc | | | | | | 25 | 25 |
| Baryta | | | | | | | 15 |
| Xylene | 50 | 50 | 100 | 50 | 50 | 140 | 170 |
| Methyl isobutyl ketone | | | | | | 140 | |
| Total | 525 | 525 | 550 | 525 | 525 | 550 | 500 | value, at least 90% of the acid value of the nonaqueous dispersion of polymer particles.

6. The antifouling paint composition of claim 1 wherein the core component:skin component weight ratio of the polymer particles is 95:5 to 30:70.

7. The antifouling paint composition of claim 1 wherein the nonaqueous dispersion of polymer particles is obtained by dispersion polymerization of an ethylenically unsaturated monomer mixture composed mainly of an acrylic monomer in a solvent in the presence of a dispersion stabilizer using a radical polymerization initiator.

8. The antifouling paint composition of claim 7 wherein the ethylenically unsaturated monomer mixture is composed mainly of at least one monomer selected from the group consisting of methyl (meth)acrylate, ethyl (meth)acrylate, n-butyl (meth)acrylate and acrylonitrile, and further contains (meth)acrylic acid.

9. The antifouling paint composition of claim 7 wherein the dispersion stabilizer is one formed by copolymerizing a monomer mixture composed mainly of at least one monomer selected from the group consisting of n-butyl methacrylate, 2-ethylhexyl methacrylate, dodecyl methacrylate, lauryl methacrylate and stearyl methacrylate and further containing at least one monomer selected from the group consisting of styrene, methyl (meth)acrylate, ethyl (meth)acrylate, 2-hydroxyethyl (meth)acrylate, propyl (meth)acrylate and (meth)acrylic acid, and then adding glycidyl (meth)acrylate or isocyanate ethyl methacrylate to the obtained polymer to introduce a polymerizable double bond therein.

10. The antifouling paint composition of claim 1 wherein the nonaqueous dispersion of polymer particles is in the form of dispersion fine particles having an average particle size of 30 to 1,000 nm.

11. The antifouling paint composition of claim 1 wherein the resin vehicle is composed of 1 to 100 parts by weight of the nonaqueous dispersion of polymer particles.

12. The antifouling paint composition of claim 1 wherein the resin vehicle is composed of 30 to 90% by weight of the nonaqueous dispersion of polymer particles.

13. The antifouling paint compositin of claim 1 wherein the resin vehicle contains another resin compatible with the nonaqueous dispersion of polymer particles.

14. The antifouling paint composition of claim 13 wherein the another resin is a rosin.

15. The antifouling paint composition of claim 1 wherein the antifouling agent is cuprous oxide or zinc ethylenebis(dithiocarbamate).

16. The antifouling paint composition of claim 1 wherein the antifouling agent is contained in an amount of 25 to 300 parts by weight per 100 parts by weight of the resin vehicle.

17. An article coated with the antifouling paint composition of claim 1.

18. The antifouling paint composition of claim 7 wherein the solvent is selected from the group consisting of aliphatic hydrocarbons, xylene, toluene and mixtures thereof.

* * * * *